United States Patent
Li et al.

(10) Patent No.: US 9,472,165 B2
(45) Date of Patent: Oct. 18, 2016

(54) METHOD AND SYSTEM FOR ACHIEVING MOVING SYNCHRONIZATION IN REMOTE CONTROL AND COMPUTER STORAGE MEDIUM

(71) Applicant: TENCENT TECHNOLOGY (SHENZHEN) COMPANY LIMITED, Shenzhen (CN)

(72) Inventors: Guohong Li, Shenzhen (CN); Longfeng Wei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 50 days.

(21) Appl. No.: 14/537,338

(22) Filed: Nov. 10, 2014

(65) Prior Publication Data

US 2015/0062008 A1    Mar. 5, 2015

Related U.S. Application Data

(63) Continuation of application No. PCT/CN2013/075119, filed on May 3, 2013.

(30) Foreign Application Priority Data

May 8, 2012    (CN) .......................... 2012 1 0140232

(51) Int. Cl.
*G09G 5/12* (2006.01)
*G06F 3/03* (2006.01)
(Continued)

(52) U.S. Cl.
CPC  *G09G 5/12* (2013.01); *G06F 3/03* (2013.01); *G06F 3/1462* (2013.01);
(Continued)

(58) Field of Classification Search
CPC ............... G09G 5/12; G09G 2354/00; G09G 2370/02; G09G 2320/0261; G06F 3/1462; G06F 3/03; G06F 3/038; H04N 21/44204; H04N 21/42204; H04N 5/4403; H04N 5/144
See application file for complete search history.

(56) References Cited

U.S. PATENT DOCUMENTS

| | | | |
|---|---|---|---|
| 6,115,027 A * | 9/2000 | Hao ........................ | G06F 3/038 345/157 |
| 2004/0215743 A1 | 10/2004 | Cook et al. | |
| 2010/0110001 A1* | 5/2010 | Yamamoto .............. | G06F 3/017 345/156 |

FOREIGN PATENT DOCUMENTS

| CN | 1941788 A | 4/2007 |
|---|---|---|
| CN | 101751153 A | 6/2010 |

OTHER PUBLICATIONS

Extended European Search Report issued Jul. 6, 2015 re: Application No. 13787758.5; pp. 1-6; US 2010/110001 A1.
(Continued)

*Primary Examiner* — Andrew Sasinowski
(74) *Attorney, Agent, or Firm* — Cantor Colburn LLP

(57) ABSTRACT

The present disclosure relates to a method for achieving moving synchronization in remote control, which includes: obtaining a remote control instruction, and extracting a target speed and a remote moment from the remote control instruction; obtaining a local moving state of a controlled object, the local moving state including a local speed and a local moment of the controlled object; calculating a delay time according to the remote control moment and the local moment; and moving the controlled object according to the delay time, the target speed, the local speed and a preset synchronization time. In addition, also provided is a system for achieving moving synchronization in remote control and a computer storage medium. The aforementioned method and system for achieving moving synchronization in remote control and the computer storage medium enable the moving synchronization effect to be smoother.

6 Claims, 3 Drawing Sheets

(51) Int. Cl.
- *H04N 5/44* (2011.01)
- *H04N 21/422* (2011.01)
- *H04N 21/442* (2011.01)
- *G06F 3/14* (2006.01)
- *G06F 3/038* (2013.01)
- *H04N 5/14* (2006.01)

(52) U.S. Cl.
CPC ..... *H04N 5/4403* (2013.01); *H04N 21/42204* (2013.01); *H04N 21/44204* (2013.01); *G06F 3/038* (2013.01); *G09G 2320/0261* (2013.01); *G09G 2354/00* (2013.01); *G09G 2370/02* (2013.01); *H04N 5/144* (2013.01)

(56) References Cited

OTHER PUBLICATIONS

International Preliminary Report on Patentability and Written Opinion issued Nov. 11, 2014 re: Application No. PCT/CN2013/075119; pp. 1-7; citing: CN1941788A, CN101751153A, US2004215743A1, U.S. Pat. No. 6,115,027A.

International Search Report issued Aug. 8, 2013 re: Application No. PCT/CN2013/075119; citing: CN 1941788 A, CN 101751153 A, US 2004215743 A1 and U.S. Pat. No. 6,115,027 A.

* cited by examiner

METHOD AND SYSTEM FOR ACHIEVING MOVING SYNCHRONIZATION IN REMOTE CONTROL AND COMPUTER STORAGE MEDIUM

CROSS-REFERENCES TO RELATED APPLICATIONS

This application is a continuation of International Patent Application No. PCT/CN2013/075119, filed on May 3, 2013, which claims priority to Chinese patent application No. 201210140232.8, filed on May 8, 2012, the contents of both of said applications are incorporated herein by reference in their entirety.

FIELD OF THE INVENTION

The present disclosure relates to network technologies, and more particular to a method and system for achieving moving synchronization in remote control and computer storage medium.

BACKGROUND ART

With the development of the network technologies, some applications adopting remote control technologies have emerged, for example, a remote meeting, a remote desktop, a remote whiteboard, an online game, etc. In these applications, a user can send an instruction in a remote to a terminal so as to control the terminal. The terminal can display remote control results by moving a controlled object.

The controlled object can be displaying elements on the terminal, and can be a cursor, an icon, a picture, an animation, or a 2D/3D model. For example, in a remote whiteboard application, the controlled object is a cursor, operations that a user moves a mouse can be remotely detected, and a cursor control instruction can be generated according to a track of the mouse's movement and can be sent to the terminal. The terminal controls a cursor's movement on a display screen of the terminal according to the cursor control instruction. In an online game, the controlled object is a 2D/3D model (i.e., player character), the client can move the 2D/3D model on the display screen according to a character control instruction issued by a server.

However, since the actual network environment cannot reach 0 delay in theory, thus there may be a position deviation (lag or advanced) when locating the controlled object in the terminal. In the typical technology, when achieving moving synchronization, a target position is usually extracted from the control instruction and then a current position of the controlled object is directly set to be the target position, i.e., resetting the position of the controlled object, it will appear in the visual that the controlled object jumps on the display screen, causing the moving synchronization effect not smooth enough.

SUMMARY

In view of this, it is necessary to provide a method for achieving moving synchronization in remote control, which can enable moving synchronization effect to be smoother.

A method for achieving moving synchronization in remote control includes:

obtaining a remote control instruction, and extracting a target speed and a remote moment from the remote control instruction;

obtaining a local moving state of the controlled object; wherein the local moving state includes a local speed and a local moment of the controlled object;

calculating a delay time according to the remote control moment and the local moment;

moving the controlled object according to the delay time, the target speed, the local speed and a preset synchronization time.

In one embodiment, the step of moving the controlled object according to the delay time, the target speed, the local speed and a preset synchronization time specifically includes:

calculating a synchronization acceleration and a synchronization initial velocity according to the delay time, the target speed, the local speed and the preset synchronization time;

moving the controlling object within the preset synchronization time according to the synchronization acceleration and the synchronization initial velocity.

In one embodiment, the step of calculating a synchronization acceleration and a synchronization initial velocity according to the delay time, the target speed, the local speed and the preset synchronization time specifically includes:

calculating the synchronization acceleration and the synchronization initial velocity according to a binary linear equation group:

$$\begin{cases} V_T + A \times T_{sync} = V_M \\ V_0 \times T_{delay} + V_T \times T_{sync} + A \times T_{sync}^2 / 2 = V_M \times (T_{delay} + T_{sync}) \end{cases}$$

where, $V_T$ is the synchronization initial velocity, A is the synchronization acceleration, $T_{sync}$ is the preset synchronization time, $V_M$ is the target speed, $V_0$ is the local speed, and $T_{delay}$ is the delay time.

In one embodiment, the step of moving the controlling object within the preset synchronization time according to the synchronization acceleration and the synchronization initial velocity specifically includes:

when $V_M$ is greater than $V_0$, taking $V_T \times 80\%$ as an initial velocity, and moving the controlled object at variable speeds according to the synchronization acceleration speed within the synchronization time; when $V_M$ is smaller than $V_0$, taking $V_T \times 120\%$ as an initial velocity, and moving the controlled object at variable speeds according to the synchronization acceleration speed within the synchronization time.

In one embodiment, the synchronization acceleration speed includes a startup acceleration and an end acceleration;

the step of calculating a synchronization acceleration and a synchronization initial velocity according to the delay time, the target speed, the local speed and the preset synchronization time specifically includes:

assigning the local speed to the synchronization initial velocity;

calculating the startup acceleration and the end acceleration according to a ternary linear equation group:

$$\begin{cases} V_0 + A_{begin} \times T_{sync}/2 = V_H \\ V_H + A_{end} \times T_{sync}/2 = V_M \\ V_0 \times T_{delay} + V_0 \times T_{sync}/2 + A_{begin} \times T_{sync}^2/8 + \\ V_H \times T_{sync}/2 + A_{end} \times T_{sync}^2/8 = V_M \times (T_{delay} + T_{sync}) \end{cases}$$

where, $V_0$ is the local speed, $A_{begin}$ is the startup acceleration, $T_{sync}$ is the synchronization time, $V_H$ is an intermediate variable which represents a speed obtained through accelerating $V_0$ at the acceleration $A_{begin}$ for a time length of $\frac{1}{2}T_{sync}$, $A_{end}$ is the end acceleration, $V_M$ is the target speed, and $T_{delay}$ is the delay time.

In one embodiment, the step of moving the controlled object according to the synchronization acceleration and the synchronization initial velocity within the preset synchronization time specifically includes:

moving the controlled object at the synchronization initial velocity with the startup acceleration for a time length of one half of the synchronization time;

moving the controlled object with the end acceleration for a time length of one half of the synchronization time.

Further, it is also necessary to provide a system for achieving moving synchronization in remote control, which can enable moving synchronization effect to be smoother.

A system for achieving moving synchronization in remote control includes:

a control instruction obtaining module configured to obtain a remote control instruction, and extract a target speed and a remote moment from the remote control instruction;

a local state obtaining module configured to obtain a local moving state of the controlled object; wherein the local moving state includes a local speed and a local moment of the controlled object;

a delay time calculating module configured to calculate a delay time according to the remote control moment and the local moment;

a synchronization moving module configured to move the controlled object according to the delay time, the target speed, the local speed and a preset synchronization time.

In one embodiment, the synchronization moving module is configured to calculate a synchronization acceleration and a synchronization initial velocity according to the delay time, the target speed, the local speed and the preset synchronization time; move the controlling object within the preset synchronization time according to the synchronization acceleration and the synchronization initial velocity.

In one embodiment, the synchronization moving module is further configured to calculate the synchronization acceleration and the synchronization initial velocity according to a binary linear equation group:

$$\begin{cases} V_T + A \times T_{sync} = V_M \\ V_0 \times T_{delay} + V_T \times T_{sync} + A \times T_{sync}^2 / 2 = V_M \times (T_{delay} + T_{sync}) \end{cases}$$

where, $V_T$ is the synchronization initial velocity, $A$ is the synchronization acceleration, $T_{sync}$ is the preset synchronization time, $V_M$ is the target speed, $V_0$ is the local speed, and $T_{delay}$ is the delay time.

In one embodiment, the synchronization moving module is also configured to, when $V_M$ is greater than $V_0$, take $V_T \times 80\%$ as an initial velocity, and move the controlled object at variable speeds according to the synchronization acceleration speed within the synchronization time; when $V_M$ is smaller than $V_0$, take $V_T \times 120\%$ as an initial velocity, and move the controlled object at variable speeds according to the synchronization acceleration speed within the synchronization time.

In one embodiment, the synchronization acceleration speed includes a startup acceleration and an end acceleration;

the synchronization moving module is further configured to assign the local speed to the synchronization initial velocity; calculate the startup acceleration and the end acceleration according to a ternary linear equation group:

$$\begin{cases} V_0 + A_{begin} \times T_{sync}/2 = V_H \\ V_H + A_{end} \times T_{sync}/2 = V_M \\ V_0 \times T_{delay} + V_0 \times T_{sync}/2 + A_{begin} \times T_{sync}^2/8 + \\ V_H \times T_{sync}/2 + A_{end} \times T_{sync}^2/8 = V_M \times (T_{delay} + T_{sync}) \end{cases}$$

where, $V_0$ is the local speed, $A_{begin}$ is the startup acceleration, $T_{sync}$ is the synchronization time, $V_H$ is an intermediate variable which represents a speed obtained through accelerating $V_0$ at the acceleration $A_{begin}$ for a time length of $\frac{1}{2}T_{sync}$, $A_{end}$ is the end acceleration, $V_M$ is the target speed, and $T_{delay}$ is the delay time.

In one embodiment, the synchronization moving module is further configured to move the controlled object at the synchronization initial velocity with the startup acceleration for a time length of one half of the synchronization time; move the controlled object with the end acceleration for a time length of one half of the synchronization time.

In addition, it is also necessary to provide a computer storage medium, which can enable moving synchronization effect to be smoother.

A computer storage medium for storing computer-executable instructions which are configured to perform a method for achieving moving synchronization in remote control, the method including:

obtaining a remote control instruction, and extracting a target speed and a remote moment from the remote control instruction;

obtaining a local moving state of the controlled object; wherein the local moving state includes a local speed and a local moment of the controlled object;

calculating a delay time according to the remote control moment and the local moment;

moving the controlled object according to the delay time, the target speed, the local speed and a preset synchronization time.

In the above method and system for achieving moving synchronization in remote control and the computer storage medium, after obtaining the remote control instruction and the local moving state, positions of the controlled object are gradually adjusted within the preset synchronization time, thereby achieving moving synchronization. Comparing with the typical synchronization method of directly resetting the position of the controlled object, there is no larger mutation in the process of changing the positions of the controlled object, so as to enable the moving synchronization effect to be smoother, thereby avoiding the case that the controlled object jumps on a display screen.

DETAILED DESCRIPTION

Figure 1:
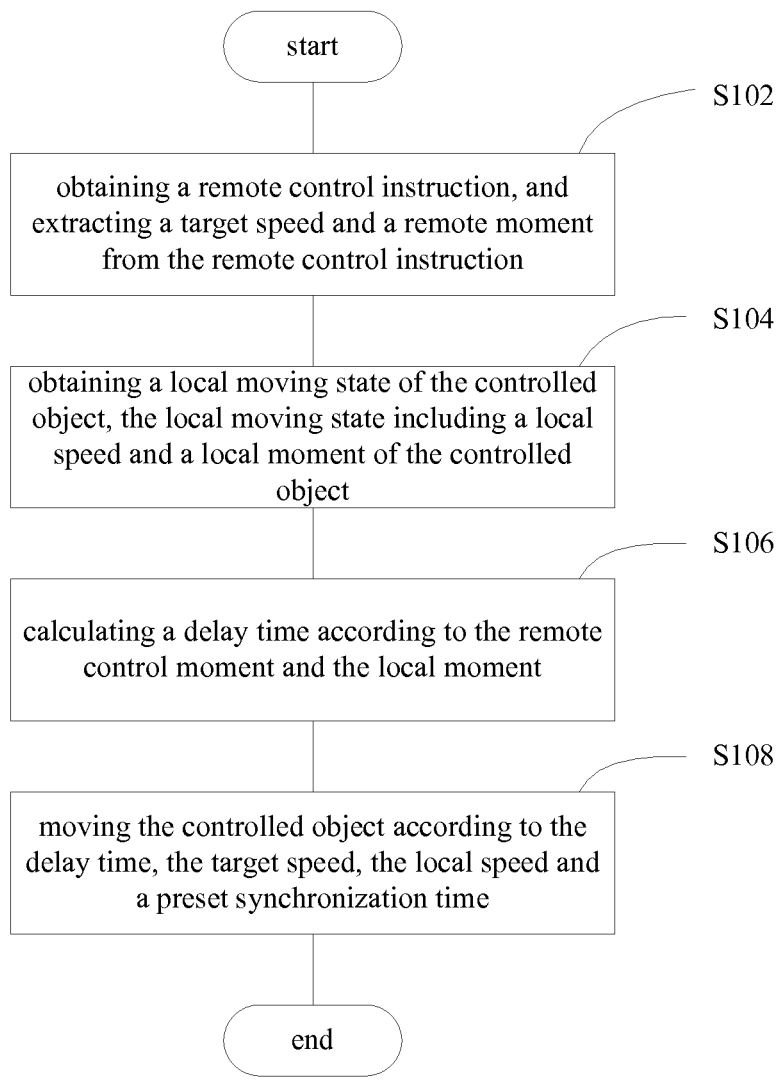
FIG. 1 is a flow chart of a method for achieving moving synchronization in remote control according to one embodiment.

In one embodiment, as shown in FIG. 1, a method for achieving moving synchronization in remote control includes following steps.

Step S102: obtaining a remote control instruction, and extracting a target speed and a remote moment from the remote control instruction.

The remote control instruction refers to a control instruction sent by a remote. The target speed refers to a speed at which the controlled object is expected to move. The remote moment refers to a moment when the remote control instruction is sent. The remote control instruction can be sent to a terminal through a remote controller in the remote. In one embodiment, the remote controller is a remote mouse input system. A moving speed of a mouse (the moving speed can be a vector) can be collected according to a default sampling interval, the remote control instruction can be generated according to the moving speed (i.e., target speed) and a sampling moment (i.e., remote moment) and can be sent. When the sampling interval is smaller, a track of the mouse's movement can be divided into a plurality of line segments. A plurality of collected control instructions can be used to make the controlled object on the terminal move uniformly at different speeds on each line segment along a track formed by connecting the plurality of line segments.

In another embodiment, the remote controller can be an online game server, and the terminal can be a game client. The online game server regularly issues a control instruction containing a remote moment and an expected moving speed (target speed) of a game character to the game client.

Step S104: obtaining a local moving state of the controlled object, the local moving state including a local speed and a local moment of the controlled object.

The local moving state refers to state information of the controlled object on the terminal when the remote control instruction is received. The local speed refers to a moving speed of the controlled object (the moving speed can be a vector) when the remote control instruction is received. The local moment is a moment when the remote control instruction is received.

Step S106: calculating a delay time according to the remote control moment and the local moment.

The delay time can be obtained by calculating a difference between the local moment and the remote moment. The delay time represents a waiting time before the terminal receives the remote control instruction after the remote controller sends the remote control instruction, and is a value greater than 0.

Step S108: moving the controlled object according to the delay time, the target speed, the local speed and a preset synchronization time.

The synchronization time refers to a time used for moving the controlled object to be synchronized with the remote.

In one embodiment, the step of moving the controlled object according to the delay time, the target speed, the local speed and a preset synchronization time can specifically include:

calculating a synchronization acceleration and a synchronization initial velocity according to the delay time, the target speed, the local speed and the preset synchronization time; moving the controlling object within the preset synchronization time according to the synchronization acceleration and the synchronization initial velocity. It should be noted, the synchronization acceleration can be a constant, or a value which is continuously or discretely changed over time.

In this embodiment, the synchronization acceleration is a constant. The step of calculating a synchronization acceleration and a synchronization initial velocity according to the delay time, the target speed, the local speed and the preset synchronization time can specifically include:

calculating the synchronization acceleration and the synchronization initial velocity according to a binary linear equation group:

$$\begin{cases} V_T + A \times T_{sync} = V_M \\ V_0 \times T_{delay} + V_T \times T_{sync} + A \times T_{sync}^2/2 = V_M \times (T_{delay} + T_{sync}) \end{cases};$$

where, $V_T$ is the synchronization initial velocity, A is the synchronization acceleration, $T_{sync}$ is the preset synchronization time, $V_M$ is the target speed, $V_0$ is the local speed, and $T_{delay}$ is the delay time.

Figure 2:
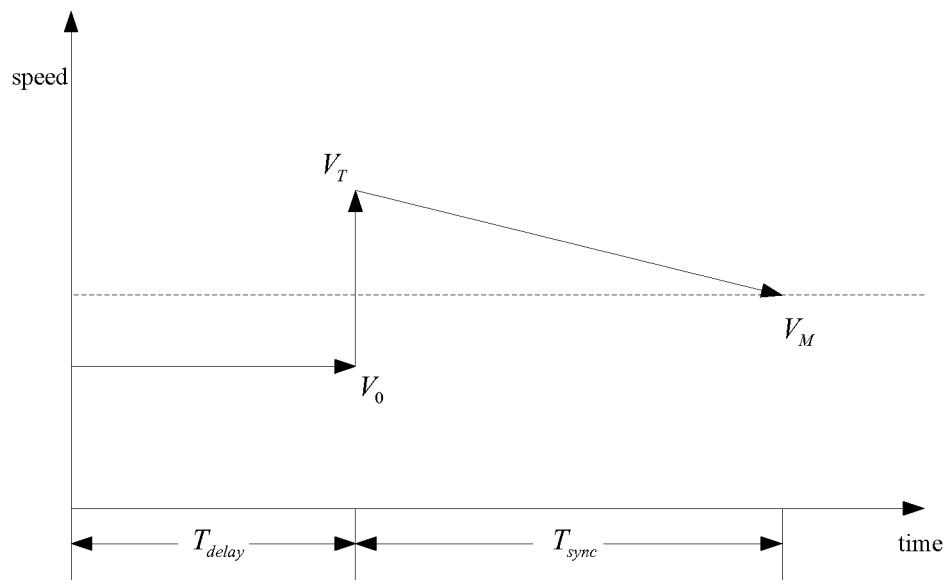
FIG. 2 is a diagram showing changes of moving speeds of a controlled object within a delay time and a synchronization time according to one embodiment.

After the above binary linear equation group is solved, as shown in FIG. 2, at the beginning of the synchronization, a moving speed of the controlled object can be set to be $V_T$, and then the controlled object has a uniformly accelerated motion or a uniformly retarded motion with the acceleration A within the synchronization time, until an end of the synchronization time. At this moment, the moving speed of the controlled object is $V_M$.

The synchronization is completed by moving the controlled object in form of a uniformly accelerated motion or a uniformly retarded motion within the synchronization time, comparing with the typical synchronization method of directly resetting the position of the controlled object, a buffer is established in vision and the displaying is more smoother, and the case that the controlled object jumps will not appear.

In this embodiment, further, the step of moving the controlling object within the preset synchronization time according to the synchronization acceleration and the synchronization initial velocity can specifically include:

when $V_M$ is greater than $V_0$, taking $V_T \times 80\%$ as an initial velocity, and moving the controlled object at variable speeds according to the synchronization acceleration speed within the synchronization time; when $V_M$ is smaller than $V_0$, taking $V_T \times 120\%$ as an initial velocity, and moving the controlled object at variable speeds according to the synchronization acceleration speed within the synchronization time.

Since the terminal usually displays the controlled object through picture frames, usually 30 frames per second, thus, changes in the moving speed of the controlled object is not continuous in actual application. It is concluded through experiments that taking a speed approximate to $V_T$ as the initial velocity to move the controlled object, the displaying effect is smoother.

In another embodiment, the synchronization acceleration speed can include a startup acceleration and an end acceleration. That is, the synchronization acceleration speed is discretely changed over time, and has two values of the startup acceleration and the end acceleration.

The step of calculating a synchronization acceleration and a synchronization initial velocity according to the delay time, the target speed, the local speed and the preset synchronization time can specifically include:

assigning the local speed to the synchronization initial velocity;

calculating a startup acceleration and an end acceleration according to a ternary linear equation group:

$$\begin{cases} V_0 + A_{begin} \times T_{sync}/2 = V_H \\ V_H + A_{end} \times T_{sync}/2 = V_M \\ V_0 \times T_{delay} + V_0 \times T_{sync}/2 + A_{begin} \times T_{sync}^2/8 + \\ V_H \times T_{sync}/2 + A_{end} \times T_{sync}^2/8 = V_M \times (T_{delay} + T_{sync}) \end{cases}$$

where, $V_0$ is the local speed, $A_{begin}$ is the startup acceleration, $T_{sync}$ is the synchronization time, $V_H$ is an intermediate variable which represents a speed obtained through accelerating $V_0$ at the acceleration $A_{begin}$ for a time length of $\frac{1}{2}T_{sync}$, $A_{end}$ is the end acceleration, $V_M$ is the target speed, and $T_{delay}$ is the delay time.

In this embodiment, the step of moving the controlled object according to the synchronization acceleration and the synchronization initial velocity within the preset synchronization time can specifically include:

moving the controlled object at the synchronization initial velocity with the startup acceleration for a time length of one half of the synchronization time;

moving the controlled object with the end acceleration for a time length of one half of the synchronization time.

Figure 3:
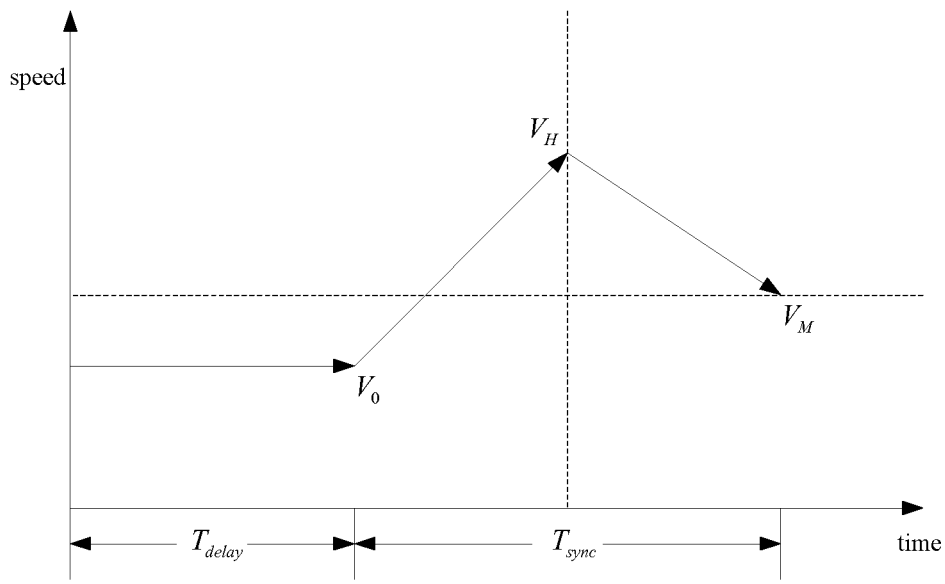
FIG. 3 is a diagram showing changes of moving speeds of a controlled object within a delay time and a synchronization time according to another embodiment.

In this embodiment, as shown in FIG. 3, the local speed can be taken as the synchronization initial velocity, and the controlled objected is moved with the startup acceleration $A_{begin}$ for a time length of a front half of the synchronization time. When the time is achieved, the moving speed of the controlled object becomes to be $V_H$. Then, the controlled object is moved at an initial velocity of $V_H$ with the end acceleration $A_{end}$ for a time length of a latter half of the synchronization time. When the synchronization time is ended, the moving speed of the controlled object becomes to be $V_M$, thereby completing the synchronization. That is to say, in the synchronization time, the controlled object is synchronized with variable accelerations.

Comparing with the manner of uniform acceleration or deceleration, adopting the manner of synchronization with variable accelerations, since the synchronization initial velocity is the local speed, thus, the moving speed of the controlled object is always in a state of continuous change without larger mutations, and thus the displaying effect is smoother.

After the above ternary linear equation group is solved, obtaining a calculation result:

$$A_{begin} = 4 \times (V_M - V_0) \times T_{delay}/T_{sync}^2 + 3 \times (V_M - V_0)/T_{sync};$$

$$A_{end} = -4 \times (V_M - V_0) \times T_{delay}/T_{sync}^2 + (V_M - V_0)/T_{sync};$$

$$V_H = 2 \times (V_M - V_0) \times T_{delay}/T_{sync} + (3 \times V_M - V_0)/T_{sync};$$

It can be seen from symbols, when $V_M$ is greater than $V_0$, $A_{begin}$ is greater than 0, $A_{end}$ is smaller than 0, the moving speed of the controlled object is accelerated at the acceleration $A_{begin}$ to $V_H$ within a time interval from 0 to 0.5 $T_{sync}$, and then is decelerated at the acceleration $A_{end}$ to $V_M$ within a time interval from 0.5 $T_{sync}$ to $T_{sync}$, when $V_M$ is smaller than $V_0$, $A_{begin}$ is smaller than 0, $A_{end}$ is greater than 0, the moving speed of the controlled object is decelerated at the acceleration $A_{begin}$ to $V_H$ within a time interval from 0 to 0.5 $T_{sync}$, and then is accelerated at the acceleration $A_{end}$ to $V_M$ within a time interval from 0.5 $T_{sync}$ to $T_{sync}$.

In addition, one present disclosure also provides one or more computer storage mediums containing computer-executable instructions; the computer-executable instructions are configured to perform a method for achieving moving synchronization in remote control. Specific steps of performing the method for achieving moving synchronization in remote control by the computer-executable instructions in the computer storage medium refers to description of the above method and will not be repeated here.

Figure 4:
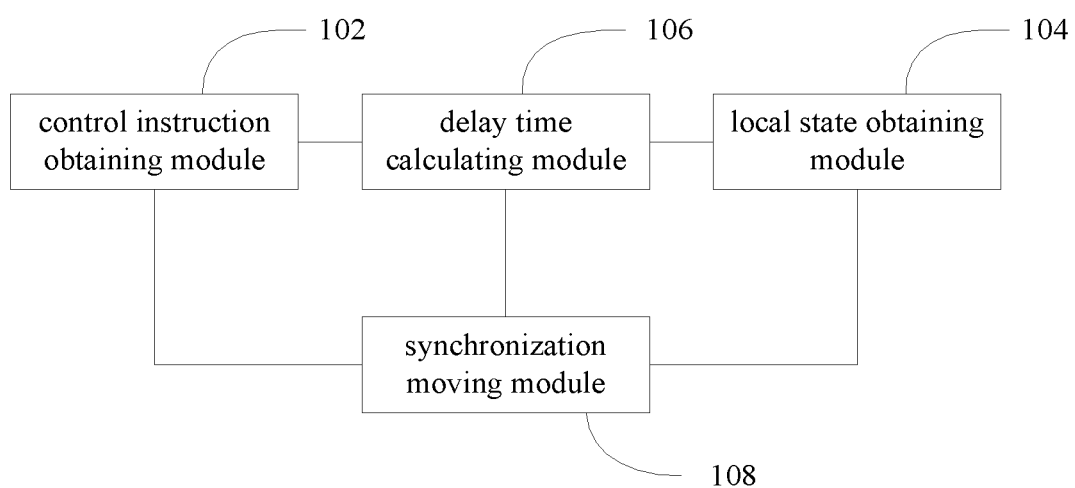
FIG. 4 is a schematic diagram of a system for achieving moving synchronization in remote control according to one embodiment.

In one embodiment, as shown in FIG. 4, a system for achieving moving synchronization in remote control includes:

a control instruction obtaining module 102, configured to obtain a remote control instruction, and extract a target speed and a remote moment from the remote control instruction.

The remote control instruction refers to a control instruction sent by a remote. The target speed refers to a speed at which the controlled object is expected to move. The remote moment refers to a moment when the remote control instruction is sent. The remote control instruction can be sent to a terminal through a remote controller in the remote. In one embodiment, the remote controller is a remote mouse input system. A moving speed of a mouse (the moving speed can be a vector) can be collected according to a default sampling interval, the remote control instruction can be generated according to the moving speed (i.e., target speed) and a sampling moment (i.e., remote moment) and can be sent. When the sampling interval is smaller, a track of the mouse's movement can be divided into a plurality of line segments. A plurality of control instructions collected by the control instruction obtaining module 102 can be used to make the controlled object on the terminal move uniformly at different speeds on each line segment along a track formed by connecting the plurality of line segments.

In another embodiment, the remote controller can be an online game server, and the terminal can be a game client. The online game server regularly issues a control instruction containing a remote moment and an expected moving speed (target speed) of a game character to the game client.

a local state obtaining module 104 configured to obtain a local moving state of the controlled object, the local moving state including a local speed and a local moment of the controlled object.

The local moving state refers to state information of the controlled object on the terminal when the remote control instruction is received. The local speed refers to a moving speed of the controlled object (the moving speed can be a vector) when the remote control instruction is received. The local moment is a moment when the remote control instruction is received.

a delay time calculating module 106 configured to calculate a delay time according to the remote control moment and the local moment.

The delay time calculating module 106 can be configured to calculate a difference between the local moment and the remote moment to obtain the delay time. The delay time represents a waiting time before the terminal receives the remote control instruction after the remote controller sends the remote control instruction, and is a value greater than 0.

a synchronization moving module 108 configured to move the controlled object according to the delay time, the target speed, the local speed and a preset synchronization time.

The synchronization time refers to a time used for moving the controlled object to be synchronized with the remote.

In one embodiment, the synchronization moving module 108 can be configured to calculate a synchronization acceleration and a synchronization initial velocity according to the delay time, the target speed, the local speed and the preset synchronization time; move the controlling object within the preset synchronization time according to the synchronization acceleration and the synchronization initial velocity. It should be noted, the synchronization acceleration can be a constant, or a value which is continuously or discretely changed over time.

In this embodiment, the synchronization acceleration is a constant. The synchronization moving module 108 can be configured to calculate the synchronization acceleration and the synchronization initial velocity according to a binary linear equation group:

$$\begin{cases} V_T + A \times T_{sync} = V_M \\ V_0 \times T_{delay} + V_T \times T_{sync} + A \times T_{sync}^2/2 = V_M \times (T_{delay} + T_{sync}) \end{cases}$$

where, $V_T$ is the synchronization initial velocity, A is the synchronization acceleration, $T_{sync}$ is the preset synchronization time, $V_M$ is the target speed, $V_0$ is the local speed, and $T_{delay}$ is the delay time.

After the above binary linear equation group is solved, as shown in FIG. 2, the synchronization moving module 108 can be configured to, at the beginning of the synchronization, set a moving speed of the controlled object to be $V_T$, and then make the controlled object have a uniformly accelerated motion or a uniformly retarded motion with the acceleration A within the synchronization time, until an end of the synchronization time. At this moment, the moving speed of the controlled object is $V_M$.

The synchronization is completed by moving the controlled object in form of a uniformly accelerated motion or a uniformly retarded motion within the synchronization time, comparing with the typical synchronization method of directly resetting the position of the controlled object, a buffer is established in vision and the displaying is more smoother, and the case that the controlled object jumps will not appear.

In this embodiment, further, the synchronization moving module 108 can also be configured to, when $V_M$ is greater than $V_0$, take $V_T \times 80\%$ as an initial velocity, and move the controlled object at variable speeds according to the synchronization acceleration speed within the synchronization time; when $V_M$ is smaller than $V_0$, take $V_T \times 120\%$ as an initial velocity, and move the controlled object at variable speeds according to the synchronization acceleration speed within the synchronization time.

Since the terminal usually displays the controlled object through picture frames, usually 30 frames per second, thus, changes in the moving speed of the controlled object is not continuous in actual application. It is concluded through experiments that taking a speed approximate to $V_T$ as the initial velocity to move the controlled object, the displaying effect is smoother.

In another embodiment, the synchronization acceleration speed can include a startup acceleration and an end acceleration. That is, the synchronization acceleration speed is discretely changed over time, and has two values of the startup acceleration and the end acceleration.

The synchronization moving module 108 can be configured to assign the local speed to the synchronization initial velocity, calculate a startup acceleration and an end acceleration according to a ternary linear equation group:

$$\begin{cases} V_0 + A_{begin} \times T_{sync}/2 = V_H \\ V_H + A_{end} \times T_{sync}/2 = V_M \\ V_0 \times T_{delay} + V_0 \times T_{sync}/2 + A_{begin} \times T_{sync}^2/8 + \\ V_H \times T_{sync}/2 + A_{end} \times T_{sync}^2/8 = V_M \times (T_{delay} + T_{sync}) \end{cases}$$

where, $V_0$ is the local speed, $A_{begin}$ is the startup acceleration, $T_{sync}$ is the synchronization time, $V_H$ is an intermediate variable which represents a speed obtained through accelerating $V_0$ at the acceleration $A_{begin}$ for a time length of ½ $T_{sync}$, $A_{end}$ is the end acceleration, $V_M$ is the target speed, and $T_{delay}$ is the delay time.

In this embodiment, the synchronization moving module 108 can also be configured to move the controlled object at the synchronization initial velocity with the startup acceleration for a time length of one half of the synchronization time; move the controlled object with the end acceleration for a time length of one half of the synchronization time.

In this embodiment, as shown in FIG. 3, the synchronization moving module 108 can also be configured to take the local speed as the synchronization initial velocity, and move the controlled objected with the startup acceleration $A_{begin}$ for a time length of a front half of the synchronization time. When the time is achieved, the moving speed of the controlled object becomes to be $V_H$. Then, the synchronization moving module 108 can also be configured to move the controlled object at an initial velocity of $V_H$ with the end acceleration $A_{end}$ for a time length of a latter half of the synchronization time. When the synchronization time is ended, the moving speed of the controlled object becomes to be $V_M$, thereby completing the synchronization. That is to say, in the synchronization time, the controlled object is synchronized with variable accelerations.

Comparing with the manner of uniform acceleration or deceleration, adopting the manner of synchronization with variable accelerations, since the synchronization initial velocity is the local speed, thus, the moving speed of the controlled object is always in a state of continuous change without larger mutations, and thus the displaying effect is smoother.

After the above ternary linear equation group is solved, obtaining a calculation result:

$A_{begin}=4 \times (V_M-V_0) \times T_{delay}/T_{sync}^2+3 \times (V_M-V_0)/T_{sync}$;

$A_{end}=-4 \times (V_M-V_0) \times T_{delay}/T_{sync}^2+(V_M-V_0)/T_{sync}$;

$V_H=2 \times (V_M-V_0) \times T_{delay}/T_{sync}+(3 \times V_M-V_0)/T_{sync}$;

It can be seen from symbols, when $V_M$ is greater than $V_0$, $A_{begin}$ is greater than 0, $A_{end}$ is smaller than 0, the moving speed of the controlled object is accelerated at the acceleration $A_{begin}$ to $V_H$ within a time interval from 0 to 0.5 $T_{sync}$, and then is decelerated at the acceleration $A_{end}$ to $V_M$ within a time interval from 0.5 $T_{sync}$ to $T_{sync}$, when $V_M$ is smaller than $V_0$, $A_{begin}$ is smaller than 0, $A_{end}$ is greater than 0, the moving speed of the controlled object is decelerated at the acceleration $A_{begin}$ to $V_H$ within a time interval from 0 to 0.5 $T_{sync}$, and then is accelerated at the acceleration $A_{end}$ to $V_M$ within a time interval from 0.5 $T_{sync}$ to $T_{sync}$.

In the above method and system for achieving moving synchronization in remote control and the computer storage medium, after obtaining the remote control instruction and the local moving state, positions of the controlled object are gradually adjusted within the preset synchronization time, thereby achieving moving synchronization. Comparing with the typical synchronization method of directly resetting the position of the controlled object, there is no larger mutation in the process of changing the positions of the controlled object, so as to enable the moving synchronization effect to be smoother, thereby avoiding the case that the controlled object jumps on a display screen.

The foregoing are only preferred embodiments of the present disclosure, and detailed description thereof is more specific, it can not therefore be construed as the limit of the scope of the present disclosure. Any modification, equivalent replacement, or improvement made without departing from the spirit and principle of the present disclosure should fall within the scope of the present disclosure. So the protection scope of the present disclosure should be defined by the protection scope of the claims.

The invention claimed is:

1. A method for achieving moving synchronization in remote control, comprising:
   obtaining a remote control instruction, and extracting a target speed and a remote moment from the remote control instruction;
   obtaining a local moving state of the controlled object; wherein the local moving state comprises a local speed and a local moment of the controlled object;
   calculating a delay time according to the remote control moment and the local moment;
   moving the controlled object according to the delay time, the target speed, the local speed and a preset synchronization time;
   wherein the step of moving the controlled object according to the delay time, the target speed, the local speed and a preset synchronization time comprises:
   calculating a synchronization acceleration and a synchronization initial velocity according to the delay time, the target speed, the local speed and the preset synchronization time;
   moving the controlling object within the preset synchronization time according to the synchronization acceleration and the synchronization initial velocity;
   wherein the step of calculating a synchronization acceleration and a synchronization initial velocity according to the delay time, the target speed, the local speed and the preset synchronization time comprises:
   calculating the synchronization acceleration and the synchronization initial velocity according to a binary linear equation group:

$$\begin{cases} V_T + A \times T_{sync} = V_M \\ V_0 \times T_{delay} + V_T \times T_{sync} + A \times T_{sync}^2 / 2 = V_M \times (T_{delay} + T_{sync}) \end{cases}$$

where, $V_T$ is the synchronization initial velocity, A is the synchronization acceleration, $T_{sync}$ is the preset synchronization time, $V_M$ is the target speed, $V_0$ is the local speed, and $T_{delay}$ is the delay time.

2. The method of claim 1, wherein the step of moving the controlling object within the preset synchronization time according to the synchronization acceleration and the synchronization initial velocity comprises:
   when $V_M$ is greater than $V_0$, taking $V_T \times 80\%$ as an initial velocity, and moving the controlled object at variable speeds according to the synchronization acceleration speed within the synchronization time; when $V_M$ is smaller than $V_0$, taking $V_T \times 120\%$ as an initial velocity, and moving the controlled object at variable speeds according to the synchronization acceleration speed within the synchronization time.

3. A system for achieving moving synchronization in remote control, comprising:
   a control instruction obtaining module configured to obtain a remote control instruction, and extract a target speed and a remote moment from the remote control instruction;
   a local state obtaining module configured to obtain a local moving state of the controlled object; wherein the local moving state comprises a local speed and a local moment of the controlled object;
   a delay time calculating module configured to calculate a delay time according to the remote control moment and the local moment;
   a synchronization moving module configured to move the controlled object according to the delay time, the target speed, the local speed and a preset synchronization time;
   wherein the synchronization moving module is configured to calculate a synchronization acceleration and a synchronization initial velocity according to the delay time, the target speed, the local speed and the preset synchronization time; move the controlling object within the preset synchronization time according to the synchronization acceleration and the synchronization initial velocity;
   wherein the synchronization acceleration speed comprises a startup acceleration and an end acceleration;
   the synchronization moving module is further configured to assign the local speed to the synchronization initial velocity; calculate the startup acceleration and the end acceleration according to a ternary linear equation group:

$$\begin{cases} V_0 + A_{begin} \times T_{sync}/2 = V_H \\ V_H + A_{end} \times T_{sync}/2 = V_M \\ V_0 \times T_{delay} + V_0 \times T_{sync}/2 + A_{begin} \times T_{sync}^2/8 + \\ V_H \times T_{sync}/2 + A_{end} \times T_{sync}^2/8 = V_M \times (T_{delay} + T_{sync}) \end{cases}$$

where, $V_0$ is the local speed, $A_{begin}$ is the startup acceleration, $T_{sync}$ is the synchronization time, $V_H$ is an intermediate variable which represents a speed obtained through accelerating $V_0$ at the acceleration $A_{begin}$ for a time length of $\frac{1}{2}T_{sync}$, $A_{end}$ is the end acceleration, $V_M$ is the target speed, and $T_{delay}$ is the delay time.

4. The system of claim 3, wherein the synchronization moving module is further configured to move the controlled object at the synchronization initial velocity with the startup acceleration for a time length of one half of the synchronization time; move the controlled object with the end acceleration for a time length of one half of the synchronization time.

5. A non-transitory computer storage medium for storing computer-executable instructions which are configured to perform a method for achieving moving synchronization in remote control, the method comprising:
   obtaining a remote control instruction, and extracting a target speed and a remote moment from the remote control instruction;
   obtaining a local moving state of the controlled object; wherein the local moving state comprises a local speed and a local moment of the controlled object;

calculating a delay time according to the remote control moment and the local moment;

moving the controlled object according to the delay time, the target speed, the local speed and a preset synchronization time;

wherein the step of moving the controlled object according to the delay time, the target speed, the local speed and a preset synchronization time comprises:

calculating a synchronization acceleration and a synchronization initial velocity according to the delay time, the target speed, the local speed and the preset synchronization time;

moving the controlling object within the preset synchronization time according to the synchronization acceleration and the synchronization initial velocity;

wherein the step of calculating a synchronization acceleration and a synchronization initial velocity according to the delay time, the target speed, the local speed and the preset synchronization time comprises:

calculating the synchronization acceleration and the synchronization initial velocity according to a binary linear equation group:

$$\begin{cases} V_T + A \times T_{sync} = V_M \\ V_0 \times T_{delay} + V_T \times T_{sync} + A \times T_{sync}^2/2 = V_M \times (T_{delay} + T_{sync}) \end{cases}$$

where, $V_T$ is the synchronization initial velocity, A is the synchronization acceleration, $T_{sync}$ is the preset synchronization time, $V_M$ is the target speed, $V_0$ is the local speed, and $T_{delay}$ is the delay time.

6. The non-transitory computer storage medium of claim 5, wherein the step of moving the controlling object within the preset synchronization time according to the synchronization acceleration and the synchronization initial velocity comprises:

when $V_M$ is greater than $V_0$, taking $V_T \times 80\%$ as an initial velocity, and moving the controlled object at variable speeds according to the synchronization acceleration speed within the synchronization time; when $V_M$ is smaller than $V_0$, taking $V_T \times 120\%$ as an initial velocity, and moving the controlled object at variable speeds according to the synchronization acceleration speed within the synchronization time.

* * * * *